United States Patent
Berni et al.

(10) Patent No.: US 8,597,601 B2
(45) Date of Patent: Dec. 3, 2013

(54) SELECTIVE BASE METALS LEACHING FROM LATERITE ORES

(75) Inventors: Tiago Valentim Berni, Belo Horizonte (BR); Antonio Clareti Pereira, Belo Horizonte (BR); Flavia Dutra Mendes, Belo Horizonte (BR)

(73) Assignee: Vale S.A., Rio de Janeiro (BR)

( * ) Notice: Subject to any disclaimer, the term of this patent is extended or adjusted under 35 U.S.C. 154(b) by 0 days.

(21) Appl. No.: 13/487,097

(22) Filed: Jun. 1, 2012

(65) Prior Publication Data

US 2013/0028816 A1    Jan. 31, 2013

Related U.S. Application Data

(60) Provisional application No. 61/493,161, filed on Jun. 3, 2011.

(51) Int. Cl.
*C22B 23/00* (2006.01)

(52) U.S. Cl.
USPC ............... 423/150.1; 423/150.4; 423/532; 423/633

(58) Field of Classification Search
USPC ............... 423/150.1, 150.4, 532, 633
See application file for complete search history.

(56) References Cited

U.S. PATENT DOCUMENTS

| | | | | | |
|---|---|---|---|---|---|
| 2,899,300 | A | * | 8/1959 | Bailey | 75/427 |
| 3,093,559 | A | * | 6/1963 | White et al. | 205/557 |
| 3,244,513 | A | * | 4/1966 | Zubryckyj et al. | 423/146 |
| 2006/0002835 | A1 | * | 1/2006 | Neudorf | 423/140 |

* cited by examiner

*Primary Examiner* — Steven Bos
(74) *Attorney, Agent, or Firm* — Arent Fox LLP

(57) ABSTRACT

A process to use ferric sulphate equilibrium to reduce overall acid consumption and iron extraction, the process comprising the steps of: (i) sulphating; (ii) selective pyrolysis and (iii) selective dissolution.

13 Claims, 1 Drawing Sheet

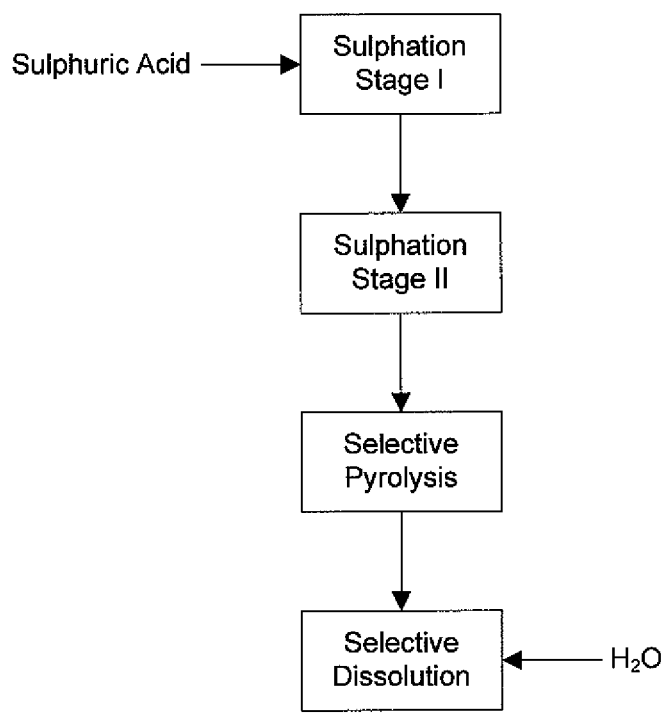

SELECTIVE BASE METALS LEACHING FROM LATERITE ORES

CROSS-REFERENCE TO RELATED APPLICATIONS

The present Application for Patent claims priority to Provisional Application No. 61/493,161 entitled "SELECTIVE BASE METALS LEACHING FROM LATERITE ORES" filed Jun. 3, 2011, and assigned to the assignee hereof and hereby expressly incorporated by reference herein.

BACKGROUND OF THE INVENTION

Conventional leaching processes for limonites have high acid consumption as most of the nickel and cobalt are associated with oxy-hydroxide ferric minerals. Those minerals are the most common form of nickel laterites, making heap leaching or atmospheric unviable alternatives. In order to reach nickel inside the oxy-hydroxides lattices, high iron dissolution is required thus resulting in high acid consumption. That dissolution also destroys the minerals, reducing stability of a possible heap. Until now, the only viable option was HPAL treatment of laterites, but that process is not very tolerant with low grade or non-upgradeable ores.

BRIEF DESCRIPTION OF THE DRAWINGS

FIG. 1 is a flowchart of the process provided by the present invention.

DESCRIPTION OF PREFERRED EMBODIMENTS

This invention, referring to FIG. 1, includes a new alternative process for limonites. The process uses ferric sulphate equilibrium to reduce overall acid consumption and iron extraction by decomposing ferric sulphates at certain conditions. The ore lattice is still broken, as ferric iron is dissolved, but the readily-formed ferric sulphate is decomposed into oxide, regenerating acid that is used to attack other elements. The process is divided into three steps: (i) sulphating; (ii) selective pyrolysis and (iii) selective dissolution.

During the sulphating step, all sulphuric acid is added to the ore, without any drying stage. The natural ore moisture is used to help the sulphating process. A drying stage can be added but is not necessary. Said step is divided in two stages: (i) first stage being sulphuric acid dosage and (ii) second stage being equilibrium displacement. The first stage, as the name states, simply doses the acid into the ore. At that first stage, the following reaction occurs with ferric iron.

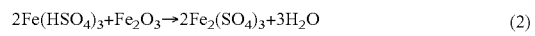

The second stage of equilibrium displacement is required to displace the sulphating reaction towards the ferric sulphate product. Temperature is known to help that process. For that reason, the material is submitted to a thermal treatment between 50 and 400° C., preferably between 150 and 250° C. The following reaction describes the process.

$$2Fe(HSO_4)_3 + Fe_2O_3 \rightarrow 2Fe_2(SO_4)_3 + 3H_2O \qquad (2)$$

The sulphuric acid that is dosed at second stage should be enough to break mineral lattices and expose target elements, like nickel and cobalt. Acid dosage is estimated between 10 and 600 kg per ton of ore, preferably between 50 and 300 kg/t.

The second step is a selective pyrolysis. Temperature is once again used to decompose ferric sulphate into sulphur trioxide and hematite. Newly-formed $SO_3$ readily attacks other elements, as nickel. Temperature required at this stage is estimated between 400 and 1000° C., preferably between 500 and 700° C.

The overall reaction is the following.

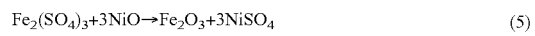

After ferric sulphate is decomposed into hematite and target metals are extracted from the ore lattice, there is a third step that is a selective dissolution that takes nickel, cobalt and the other elements into solution, making sure iron is kept as oxide. The dissolution step is done at between 15 and 100° C., preferably between 25 and 90° C. at a pH range of 1 to 5, preferably between 1.5 and 4. The pulp is easily filtered, as most solids are oxides, not hydroxides.

The ore needs to be prepared to a size fraction below 2", preferably below 0.5 mm before taken into the process of the invention. The only reason for that is to avoid agitation issues during the dissolution step. The process of the invention is flexible enough to receive low grade ores, as all equipment needed is of low capital intensity and low operational costs. The PLS that is produced has almost no iron in solution, making any downstream choice extremely simple.

Example 1

Nickel Laterite Ore Composition:

| Al2O3 | CaO | CoO | Cr2O3 | CuO | Fe2O3 | MgO | MnO | NiO | PF | SiO2 | ZnO |
|---|---|---|---|---|---|---|---|---|---|---|---|
| 2.37% | 0.10% | 0.04% | 1.16% | 0.08% | 15.75% | 4.09% | 0.24% | 0.79% | 6.02% | 69.34% | 0.02% |

It was crushed for 100% passing particles in the 0.5 mm mesh. A sample was dried for 02 hours at a temperature of 110° C. and then 400 g of said ore were weighed.

Said sample was loaded into a metal reactor and 120 g of 98% sulfuric acid was slowly added under the effect of mechanical mixing to avoid agglomerates generation. The sulfated mass was transferred to a zirconium crucible and placed in a greenhouse following a heating curve of 100° C. per hour until it reached 700° C.

After 02 hours of thermal pre-treatment, the mass is cooled and fed into a solution maintained in a pH between 2.5 and 4.0, Eh<600 mV, at a temperature between 85° C. and 95° C.

for 03 hours. After that, the solution is filtered, the residue is washed and dried, and the elements of interest are analyzed. The extraction result is 71.8% of Cobalt, 84% of Nickel and 12.5% of iron based on the original amount comprised on the lateritic ore.

Example 2

Nickel Laterite Ore Composition:

| Al2O3 | CaO | CoO | Cr2O3 | CuO | Fe2O3 | MgO | MnO | NiO | PF | SiO2 | ZnO |
| --- | --- | --- | --- | --- | --- | --- | --- | --- | --- | --- | --- |
| 1.18% | 0.00% | 0.25% | 1.16% | 0.00% | 35.79% | 0.55% | 1.95% | 0.82% | 4.93% | 53.33% | 0.04% |

By repeating the same procedures of Example 1, the extraction result is 79.6% of Cobalt, 81.7% of Nickel and 6.4% of Iron based on the original amount comprised on the lateritic ore.

Example 3

Nickel laterite ore composition:

| Al2O3 | CaO | CoO | Cr2O3 | CuO | Fe2O3 | MgO | MnO | NiO | PF | SiO2 | ZnO |
| --- | --- | --- | --- | --- | --- | --- | --- | --- | --- | --- | --- |
| 1.10% | 0.00% | 0.14% | 3.00% | 0.01% | 40.91% | 7.01% | 1.05% | 1.64% | 9.77% | 35.31% | 0.06% |

It was crushed for 100% passing particles in the 0.5 mm mesh. A sample was dried for 02 hours at a temperature of 110° C. and then 400 g of said ore were weighed.

Said sample was loaded into a metal reactor and 160 g of 98% sulfuric acid was slowly added under the effect of mechanical mixing to avoid agglomerates generation. The sulfated mass was transferred to a zirconium crucible and placed in a greenhouse following a heating curve of 100° C. per hour until it reached 700° C.

After 04 hours of thermal pre-treatment, the mass is cooled and fed into a solution maintained in a pH between 1.8 and 3.0, Eh<450 mV, at a temperature between 85° C. and 95° C. for 03 hours. After that, the solution is filtered, the residue is washed and dried, and the elements of interest are analyzed. The extraction result is 92.8% of Cobalt, 87.8% of Nickel and 4.5% of Iron based on the original amount comprised on the lateritic ore.

Aspects/Features

Increased extraction of value metal, such as nickel and cobalt;
Better deposit exploitation;
Reduced acid consumption;
Reduced consumption of neutralizing agent;
Better settling properties of pulp;
Reduced consumption of flocculants;
No need for saprolite/limonite separation.

What is claimed is:

1. A process for leaching base metals from laterite ores, comprising:
   (i) sulphating the laterite ore to obtain ferric sulphate;
   (ii) selective pyrolysis of the ferric sulphate to decompose ferric sulphate into sulphur trioxide, hematite and target metals; and
   (iii) selective dissolution of the hematite and the target metals to obtain ferric oxide and a solution containing the target metals;
   wherein the step of sulphating comprises a first stage of sulphuric acid dosage and a second stage of equilibrium displacement towards the ferric sulphate.

2. The process according to claim 1, wherein the second stage of equilibrium displacement is carried out at a temperature ranging from 50 to 400° C.

3. The process according to claim 1, wherein the first stage of sulphuric acid dosage comprises dosing from 10 to 600 kg of sulphuric acid per ton of ore.

4. The process according to claim 1, wherein the step of selective pyrolysis is carried out at a temperature ranging from 400 to 1000° C.

5. The process according to claim 1, wherein the target metals are nickel, cobalt and other elements.

6. The process according to claim 1, wherein the step of selective dissolution is carried out at a temperature ranging from 15 to 100° C.

7. The process according to claim 1, wherein the step of selective dissolution is carried out at a pH ranging from 1 to 5.

8. The process according to claim 1, wherein the step of selective dissolution comprises filtering ferric oxide from the solution containing target metals.

9. The process according to claim 8, wherein the solution containing target metals is a solution containing nickel sulphate.

10. The process according to claim 1, wherein the lateritic ore comprises limonite.

11. The process according to claim 1, wherein, prior to the step of sulphating, the ore is prepared to a size fraction below 2".

12. The process according to claim 11, wherein, prior to the step of sulphating, the ore is prepared to a size fraction below 0.5 mm.

13. The process according to claim 1, wherein the solution containing the target metals is substantially devoid of iron.

* * * * *